*INVENTOR*
ROBERT L. HARRIS

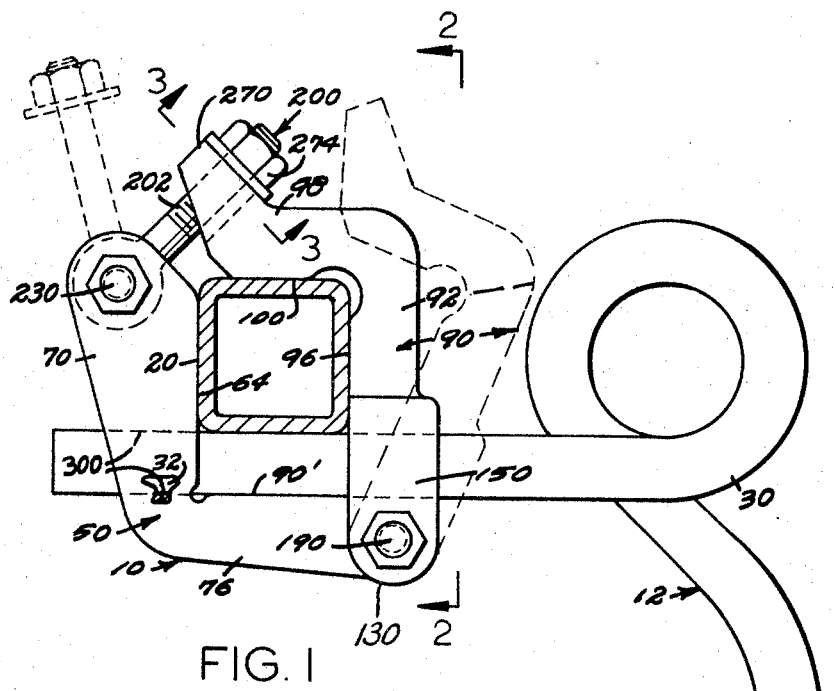
FIG. 1
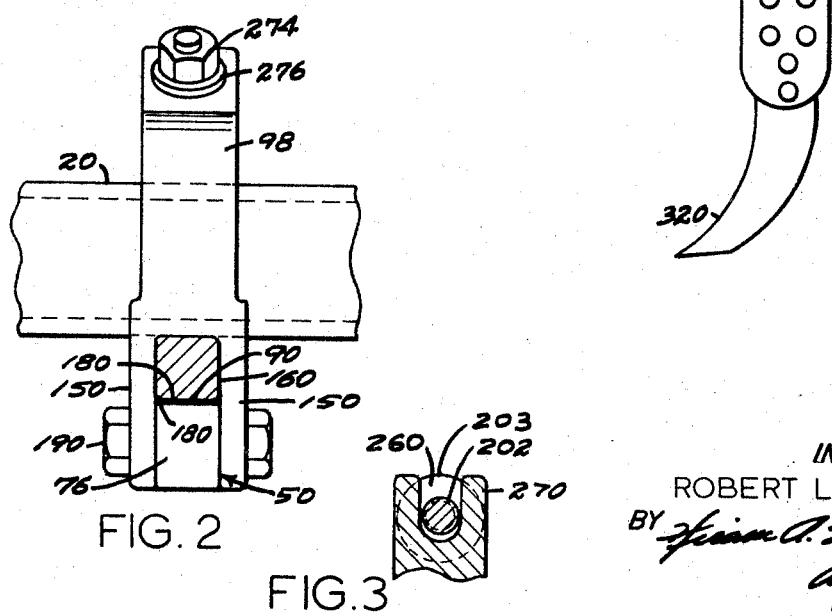
FIG. 2
FIG. 3
INVENTOR
ROBERT L. HARRIS

United States Patent Office 3,425,755
Patented Feb. 4, 1969

3,425,755
SPRING SHANK CLAMP
Robert L. Harris, 1602 N. 6th St.,
Beatrice, Nebr. 68310
Filed Mar. 22, 1966, Ser. No. 536,386
U.S. Cl. 306—1.5
Int. Cl. A01b 15/02, 23/02; F16b 7/04
2 Claims

ABSTRACT OF THE DISCLOSURE

A tool bar clamp having two pivotally connected sections, means for drawing the free ends of said sections together for clamping about a tool bar, one portion of each of the sections having an opening therethrough for receiving the spring shank of a tool bar.

Description of the prior art

A prior art way of making a tool bar clamp involved an extra loose part in addition to the two main clamp sections surrounding the tool bar.

It is an object of this invention to eliminate the extra loose part, its cost, and its possibility of becoming lost.

Summary of the invention

A too bar clamp having two pivotally connected sections, means for drawing the free ends of said sections together for clamping about a tol bar, one portion of each of the sections having an opening therethrough for receiving the spring shank of a tool bar.

Other and further objects and advantages of the present invention will be apparent from the following detailed description, drawings and claims, the scope of the invention not being limited to the drawings, themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a side elevation of the tool bar clamp of this invention shown with the spring shank therein and with the tool bar shown in vertical cross section, an open position of the clamp being shown in dotted lines.

FIGURE 2 is a sectional view taken along the line 2—2 of FIGURE 1.

FIGURE 3 is a sectional view taken along the line 3—3 of FIGURE 1.

Figure 4:
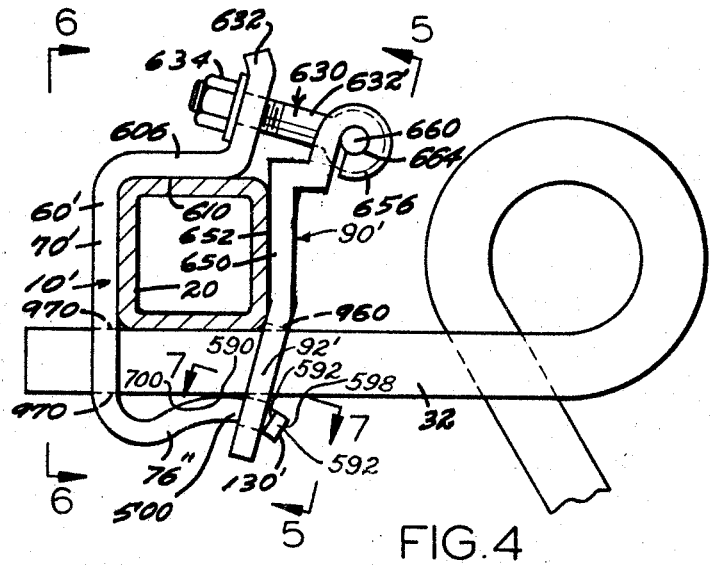
FIGURE 4 is a view similar to FIGURE 1, but showing a modified tool bar clamp.

Referring to FIGURE 1, the tool bar clamp of this invention is generally indicated at 10 and is for the purpose of holding a ground-working tool 12 to a tool bar 20 of an ammonia applicator or other ground working implement. The tool bar is rectangular or square in cross-section.

The ground working tool 12 has a spring area 30 having a spring shank 32 which is received in the clamp 10.

The clamp 10 has a first section generally indicated at 50 having a first portion 60, the latter having a first tool bar engaging clamping surface 64 on its rearward side and the first section 50 further has a second portion 76 having a second clamping surface 90' which is horizontally offset from the first clamping surface 64 and faces generally in a direction at a right angle to the general direction the first clamping surface 64 faces.

The clamp 10 has a second section 90 having a first portion 92 having a third clamping surface 96 for tool bar engagement, the third clamping surface facing the first clamping surface 64 and being parallel thereto.

The second section 90 further has a fourth clamping surface for tool bar engagement shown at 100, the fourth clamping surface being horizontally offset from the third surface 96 in a direction generally toward the first clamping surface 64.

Expressed in another way, the first, second, third, and fourth clamping surfaces 64, 90', 96, and 100 face in rearward, upward, forward, and downward directions, respectively, and are disposed in a vertical plane, a horizontal plane, a vertical plane, and a horizontal plane, respectively.

A pivotal connection means generally indicated at 130 is provided for pivotally connecting the first and second sections 50 and 90, the pivotal connection means is accomplished by having a lower end of the first portion 92 of the second section 90 provided with two downwardly extending spaced ears 150 providing therebetween an opening 160 of square vertical cross-section, as seen in a plane parallel to the first clamping surface 64, which is of square cross section with a bottom wall 180 of the opening 160 provided by the clamping surface 90'.

A rearward portion of the second portion 76 of the first section 50 is disposed between the ears 150 with the ears 150 pivotally secured thereto by means of a bolt 190 which extends through the ears 150 and the portion 76 to permit the first portion 92 of the second section 96 to swing forwardly and rearwardly at its upper end about the bolt 190 and between the full line position shown in FIGURE 1 and the dotted line position thereof shown in FIGURE 1, with the first and third clamping surfaces 64 and 96 moving toward and away from each other as the sections 50 and 90 are moved toward and away from each other.

A releasable pressing means is generally shown at 200 for pressing the first and second sections 50 and 90 toward each other in a manner for urging the first and third surfaces 64 and 96 toward each other.

The releasable pressing means 200 can comprise an eye bolt 202 pivotally connected to the upper end of the first portion 60 by a bolt 230, the shank of the eye bolt 202 being threaded and extending upwardly and rearwardly through a notch 260 in an upwardly and forwardly extending portion 270 of the upper end of the second portion 98 of the second section 90, whereby a nut 274 on the shank 202 can be tightened and loosened for drawing the sections 60 and 90 toward each other for clamping around the tool bar 20.

Suitable means are provided for attaching an agricultural implement or ground working tool 12 to the clamp 10 and such means comprises having the shank 32 of the tool 12 extend horizontally through the opening 160 under the tool bar 20 and through an opening 300 extending horizontally through the first portion 60 of the clamp first section 50.

In operation, it will be seen that when eye bolt 202 is drawn taut, the clamp 10 will have its clamping surfaces 64, 96, and 100 clamped against the forward, rearward, and upper sides of the tool bar 20 and the clamping surface 90 will clamp against the underside of the shank 32 pressing it so hard against the underside of the tool bar 20 that it will be held in an extremely firm manner.

Loosening of the clamp is preferably accomplished by unloosening but one single nut 274. In this way, horizontal adjustment of the lateral position of the ground working tool 12 with respect to a carrying implement, not shown, is rapidly accomplished.

The ground working lowermost end 320 of the ground working tool 12 can thereby be rapidly positioned with respect to the lower ends of other ground working tools attached to the same tool bar 20.

Referring to the modification of FIGURE 4, it will be seen that the clamp 10' there shown is so similar in many of its respects to the clamp of FIGURE 1 that the same numerals and description above described will apply thereto and so the numerals applied to the clamp of FIGURE 4 shall be the same numerals but with a prime mark thereby to avoid the necessity of duplicate description.

However, in the clamp of FIGURE 4, there are certain differences. For example, the pivotal connection means 130' of the clamp 10' is different than the pivotal connection 130.

The pivotal connection means 130' is formed by having the rearward end 500 of the that portion 76" which corresponds to the portion 76 of arcuate shape, convex on its upper side and concave on its lower side with a portion of its upper surface 590 serving as a surface for engaging the underside of the shank 32 of the tool 12 and with the rearwardmost terminal end of the portion 500 provided with outwardly extending transverse protrusions 592 which extend outwardly horizontally and cause the portion 500 to have a lateral width greater than the lateral width of a neck area 594 of the portion 500 which neck area 594 is disposed immediately forwardly and inwardly along the portion 500 from the rearwardmost end thereof at 598.

And so with the neck area 594 extending through an opening 600, which latter extends from forward and rearward through the portion 92' of the section 90', a pivotal connection is thereby formed, as the portion 92' is free to swing forwardly and rearwardly at its upper end.

Another difference between the clamps 10 and 10' is that the clamp 10' has its first section 60' provided with a rearwardly extending tool bar engaging portion 606 having an undersurface 610 which is horizontal and which is adapted to engage the upper surface of the tool bar 20.

Figure 5:
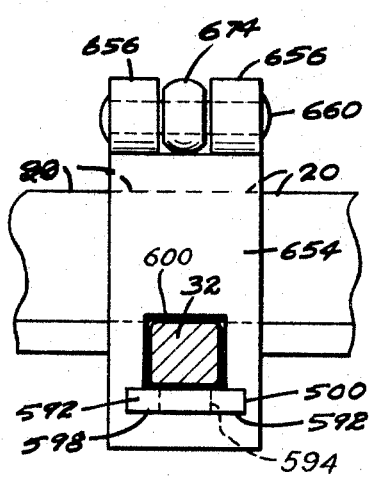
FIGURE 5 is a sectional view taken along the line 5—5 of FIGURE 4.
Figure 6:
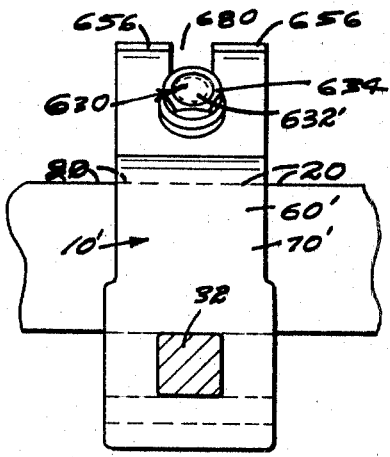
FIGURE 6 is a sectional view taken along the line 6—6 of FIGURE 4.
Figure 7:
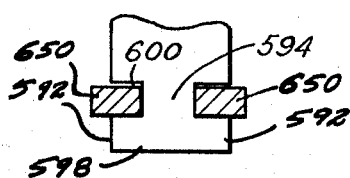
FIGURE 7 is a sectional view taken along the line 7—7 of FIGURE 4.

A further difference between the two modifications is in the fact that the releasable pressing means 630 of FIGURE 4 has a dog 632 which is attached to the rearward end of the portion 606 and extending upwardly therefrom and slidably receiving an eye bolt 632' therethrough having a nut 634 thereon, the eye bolt extending rearwardly with the nut 634 at its forward end and an eye 674 at its rearward end which, as best seen in FIGURE 5, rotatably receives a pin 660 which extends transversely to the shank of a bolt 632', the pin 660 being received in horizontally extending openings 664 extending through upper end portion 656 of the portion 650, whereby a tightening of the nut 634 will cause the second section 650 to be drawn toward the first section 70' so that a vertical third clamping surface 652 of the second section 650 and specifically of the second portion 654 of the second section 650, can press against the tool bar 20 which it engages along a plane parallel to the rearward side 680 of the tool bar 20.

The portion 500 has an upper surface 700 which serves as the second clamping surface in the same manner as does the surface 90' of FIGURE 1 modification. The second clamping surface 700 presses firmly against the underside of the spring bar 32 clamping it firmly.

It will be seen that the undersurface 610 of the rearwardly extending tool bar engaging portion 606 serves as the fourth clamping surface of the clamp of FIGURE 4 and clamps firmly against the upperside of the tool bar 20 when the bolt 632' is tightened.

As thus described, it will be seen that in operation the modification of FIGURE 4 works substantially the same as the modification of FIGURE 1.

As thus described, it is believed that this invention is believed to fulfill the objectives above set forth in providing a clamp which can be much more rapidly adjusted for great labor saving.

I claim:

1. A tool bar clamp for holding a spring shank to a tool bar comprising: a first section having a first portion having a first tool bar engaging clamping surface and said first section having a second portion having a second tool bar clamping surface which is horizontally offset from said first clamping surface and faces generally in a direction at a right angle to the general direction said first clamping surface faces, said clamp having a second section having a first portion having a third clamping surface for tool bar engagement, said third clamping surface facing said first clamping surface, said second section further having a fourth clamping surface for tool bar engagement, the fourth clamping surface being horizontally offset from said third surface in a direction generally toward said first clamping surface, means pivotally connecting said first and second sections at a location between said second and third clamping surfaces for movement of said first and third clamping surfaces toward and away from each other, releasable means for pressing said first and second sections towards each other in a manner for urging said first and third surfaces towards each other, and means for attaching an agricultural implement to said clamp, said means for attaching an agricultural implement comprising a first hole extending through the said first portion of said first section between said first and second surfaces and a second hole aligned with said first hole and extending through said second section between said second and third surfaces and disposed between said pivotal connecting means and said third surface.

2. The combination of claim 1 in which said holes are of identical size and of rectangular shape in a cross section taken transverse to their alignment.

References Cited

UNITED STATES PATENTS 2,490,237  12/1949  Silver _____ 306—1.5

FOREIGN PATENTS 67,740  4/1944  Norway.
947,229  1/1949  France.
636,660  5/1950  Great Britain.

CARL W. TOMLIN, *Primary Examiner.*

ANDREW KUNDRAT, *Assistant Examiner.*

U.S. Cl. X.R.

287—51, 54